United States Patent
Shah

(10) Patent No.: US 6,603,480 B1
(45) Date of Patent: *Aug. 5, 2003

(54) METHOD AND APPARATUS FOR POWER MANAGING DISPLAY DEVICES

(75) Inventor: Nilesh V. Shah, Folsom, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,041

(22) Filed: Dec. 30, 1998

(51) Int. Cl.[7] .......................... G06F 15/00; G06T 1/00; G09G 5/00
(52) U.S. Cl. ........................ 345/501; 345/213
(58) Field of Search .................. 345/204, 213, 345/214, 211, 501, 509, 515, 520, 526, 694; 713/323

(56) References Cited

U.S. PATENT DOCUMENTS

| | | | | |
|---|---|---|---|---|
| 5,369,744 A | * | 11/1994 | Fukushima et al. | 395/162 |
| 5,524,249 A | * | 6/1996 | Suboh | 713/322 |
| 5,606,336 A | * | 2/1997 | Yuki | 345/1 |
| 5,801,714 A | * | 9/1998 | Holt | 345/501 |
| 5,805,151 A | * | 9/1998 | Hwang | 345/213 |
| 5,859,635 A | * | 1/1999 | Hang et al. | 345/213 |
| 5,903,253 A | * | 5/1999 | Mizutome et al. | 345/694 |
| 6,028,585 A | * | 2/2000 | Ishii et al. | 345/132 |
| 6,067,083 A | * | 5/2000 | Glen et al. | 345/213 |
| 6,105,142 A | * | 8/2000 | Goff et al. | 713/324 |
| 6,122,748 A | * | 9/2000 | Hobson | 713/323 |
| 6,446,213 B1 | * | 9/2002 | Yamaki | 713/300 |

* cited by examiner

*Primary Examiner*—Richard Hjerpe
*Assistant Examiner*—Kevin M. Nguyen
(74) *Attorney, Agent, or Firm*—Blakely, Sokoloff, Taylor & Zafman LLP

(57) ABSTRACT

An embodiment of a graphics controller includes a clock output circuit to output a clock signal and also includes a display device control signal input/output circuit to output a display device control signal. The graphics controller further includes a display device data bus input/output circuit to output an encoded information on a display device data bus when the display device control signal output circuit asserts the display device control signal, the encoded information to represent a power management state.

21 Claims, 4 Drawing Sheets

METHOD AND APPARATUS FOR POWER MANAGING DISPLAY DEVICES

FIELD OF THE INVENTION

The present invention pertains to the field of power management in a computer system. More particularly, this invention pertains to the field of power managing display devices in a computer system.

BACKGROUND OF THE INVENTION

Display devices for interfacing computer systems with external displays such as televisions, flat panel Liquid Crystal Displays (LCDs), and digital television are now being regularly included in computer systems. Such devices receive either RGB or YUV data from a graphics controller and produce an output that is suitable for viewing on a television, LCD, or digital television. The ability for a computer system to interface with these types of displays is becoming more and more important as computer systems are integrated into user's living rooms and as computer systems take on newer tasks such as movie or television viewing, multi-player game playing over the Internet, video telephoning, etc.

A de facto standard has evolved among various computer industry companies for interfacing display devices with graphics controllers. The de facto standard includes several clock and control signals, including a clock in signal, a clock out signal, a blanking signal, a vertical sync signal, and a horizontal sync signal. The de facto standard also includes an eight bit data bus. As mentioned above, either RGB or YUV data is delivered over the data bus.

A major concern among computer users and manufacturers has been that of power management. One power management standard that has gained wide acceptance in the computer industry is the Advanced Configuration and Power Interface (ACPI) revision 1.0a open industry specification co-developed by Intel®, Microsoft, and Toshiba. Under the ACPI specification, an operating system is capable of checking the status of all ACPI compliant devices in the system. Based on the status of the various devices, the operating system may program a device in one of four possible states. The possible states are D0, where the device is fully on, and D1 through D3, with each of the D1 through D3 states indicating a level of power down.

As computer systems are interfaced with external displays such as television, flat panel displays, and digital television, it becomes desirable to power manage these external displays. The current de facto industry standard for interfacing display devices to graphics controllers does not provide a mechanism for passing power management information to and from the display devices.

SUMMARY OF THE INVENTION

A method and apparatus for power managing a display device are disclosed. The apparatus includes a clock output circuit to output a clock signal and also includes a display device control signal input/output circuit to output a display device control signal. The apparatus further includes a display device data bus input/output circuit to output an encoded information on a display device data bus when the display device control signal output circuit asserts the display device control signal, the encoded information to represent a power management state.

Other features and advantages of the present invention will be apparent from the accompanying drawings and from the detailed description that follows below.

BRIEF DESCRIPTION OF THE DRAWINGS

The invention is illustrated by way of example and not limitation in the figures of the accompanying drawings, in which like references indicate similar elements, and in which.

DETAILED DESCRIPTION

An embodiment of a graphics controller includes an ACPI register and an ACPI control circuit. When the ACPI register receives information that a display device that is coupled to the graphics controller must be put into an ACPI power management state, a display device data bus input/output circuit in the graphics controller outputs encoded information on the display device data bus. The encoded information is placed on the display device data bus while a display device control signal circuit in the graphics controller asserts a vertical sync control signal. After the graphics controller deasserts the vertical sync signal, the graphics controller tristates the vertical sync control signal. One clock period later, the display device begins to drive the vertical sync signal and asserts the vertical sync control signal in order to signal to the graphics controller that the encoded power management state information was received. The display device may also deliver display device status information, register information, or device storage contents to the graphics controller for storage in a memory device. The embodiment has the intended advantage of providing a power management mechanism for external display devices using previously existing interfaces while allowing for ACPI compliance.

Figure 1:
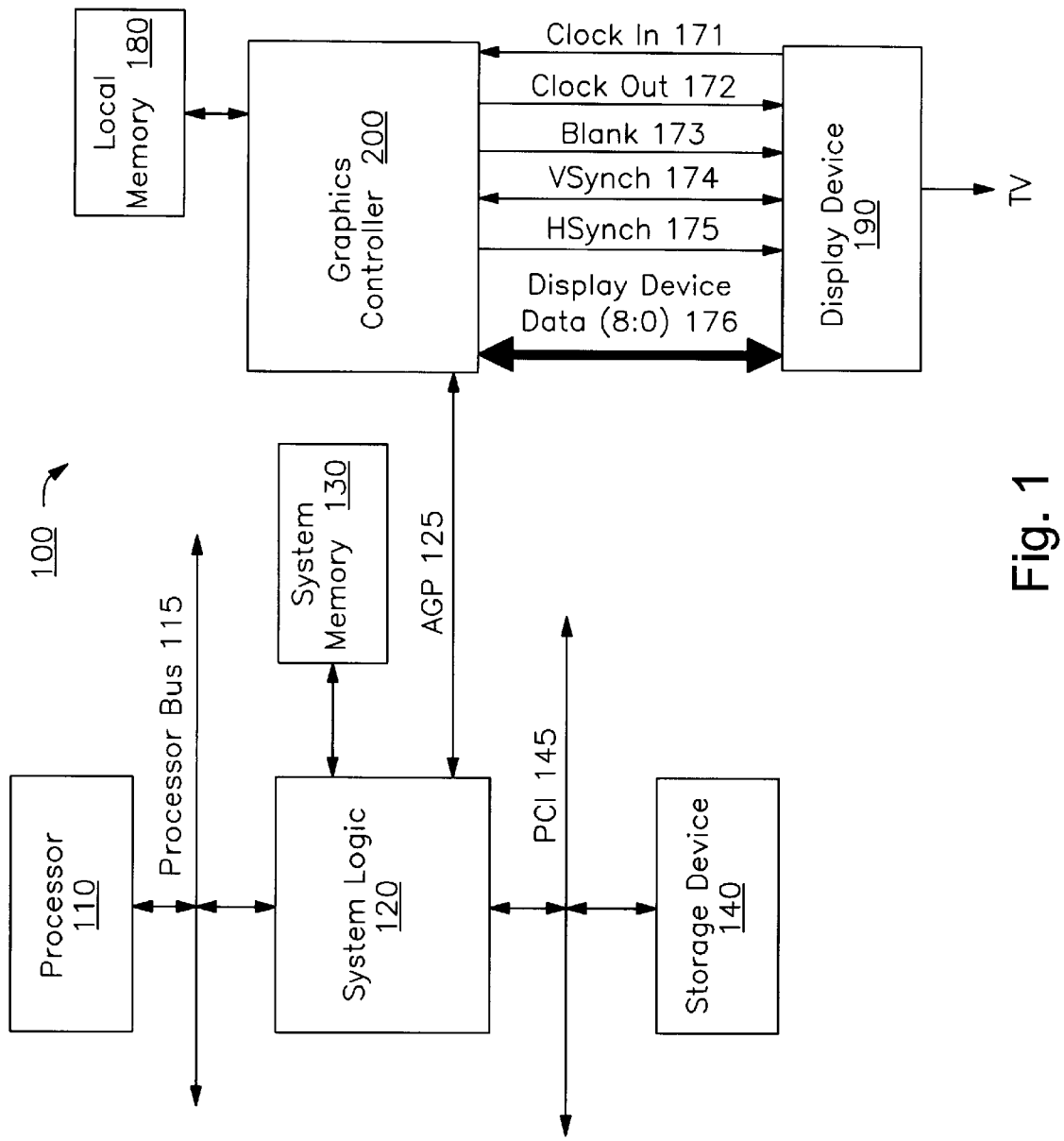
FIG. 1 shows a block diagram of one embodiment of a computer system including a graphics controller and a display device.

FIG. 1 shows a block diagram of one embodiment of a computer system 100 including a graphics controller 200 and a display device 190. The system 100 includes a processor 110 coupled to a processor bus 115. Also coupled to the processor bus 115 is a system logic device 120. The system 100 further includes a system memory 130 coupled to the system logic device 120. A storage device 140 is coupled to the system logic device 120 via a peripheral component interconnect (PCI) bus 145. The graphics controller 200 is coupled to the system logic device 120 via an advanced graphics port (AGPJ 125. A graphics device local memory 180 is coupled to the graphics controller 200.

The display device 190 is couple to the graphics controller 200 via several control and clock signals, as well as a data bus. The clock signals include a clock in signal 171 and a clock out signal 172. The control signals include a blank signal. 173, a vertical sync signal 174, and a horizontal sync signal 175. The data bus is represented by the display device data bus 176, which includes an eight bit data path. For this example embodiment, the display device includes a television encoder. Other display devices are possible, including, but not limited to, LCD transmitters and digital television interface devices.

Figure 2:
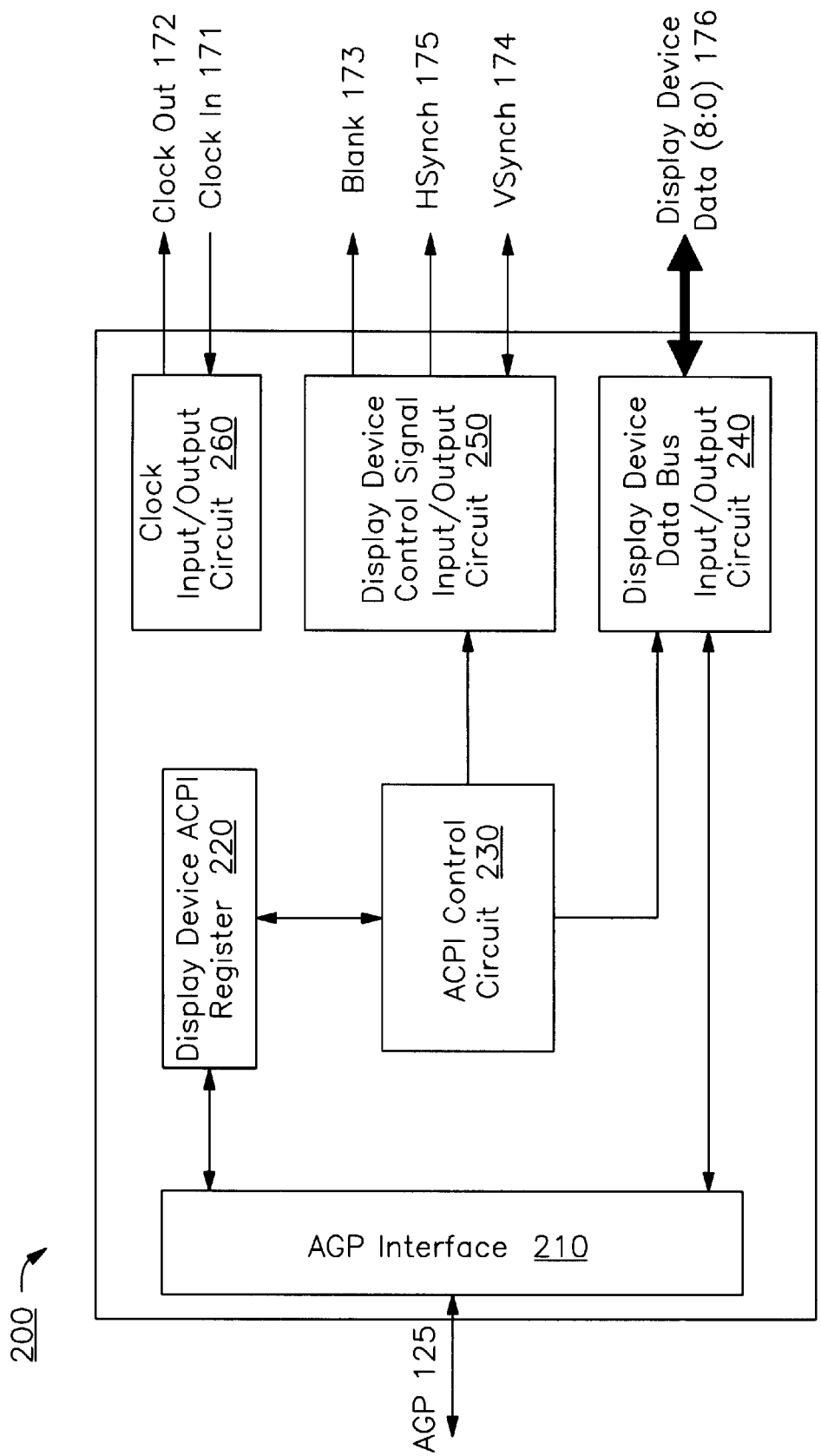
FIG. 2 is a block diagram of one embodiment of a graphics controller including an ACPI register and control circuit as well as a display device interface.

FIG. 2 is a block diagram of one embodiment of the graphics controller 200 (shown previously in FIG. 1) including a display device ACPI register 220 and an ACPI control circuit 230. The graphics controller 200 also includes an AGP interface 210. A display device interface within the graphics controller 200 includes a clock input/output circuit 260, a display device control signal input/output circuit 250, and a display device data bus input/output circuit 240.

The general ACPI power down sequence begins with an operating system determining that a computer system must power down to a certain state., This implies that system devices, including the display device 190 (shown in FIG. 1) in this example, must be asked to be in one of the D1 through D3 states. Through programming certain registers (not shown) in the graphics controller 200, the operating system issues its request for a power down. A software graphics driver is informed of the request, possibly by an interrupt or by polling the programmed registers, and deciphers the power down request issued by the operating system. The graphics driver then programs the display device ACPI register 220, and the ACPI control circuit 230 initiates power management cycles to the display device 190 (shown in FIG. 1).

The power management cycles to the display device 190 preferably occur using the vertical sync control signal 174 and the display device data bus 176. While the display device control signal input/output circuit 250 asserts the vertical sync control signal 174, the display device data bus input/output circuit 240 outputs ACPI state information on the least significant two bits of the display device data bus 176. The encoding is preferably according to the following scheme:

00: Fully On
01: D1 state
10: D2 state
11: D3 state Other encoding schemes are possible. Also, it is possible to use control signals other than the vertical sync control signal 174, such as the blank signal 173 or the horizontal sync signal 175. Using the vertical sync signal 174 carries with it the advantage of not possibly halting the viewable display in the middle of a screen refresh.

The display device 190 (shown in FIG. 1) signals to the graphics controller 200 that it has received the encoded power state information by asserting a control signal. Preferably, this is accomplished via the vertical sync signal 174. The display device 190 may also transfer status information, register contents, local storage contents, or other information to the graphics controller 200. The graphics controller 200 can cause this information to be stored in a memory device, preferably system memory, for later retrieval when the display device is taken out of a power down state.

Figure 3:
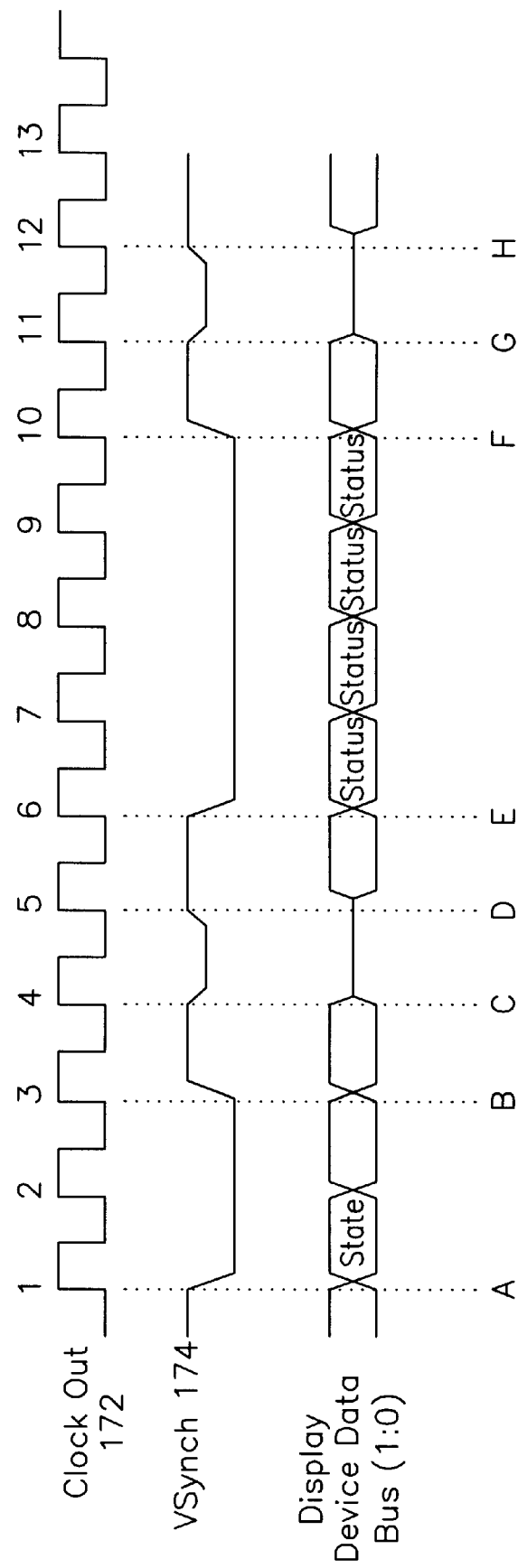
FIG. 3 is a timing diagram of one embodiment for power managing a display device.

FIG. 3 is a timing diagram showing the behavior of the vertical sync signal 174 and the display device data bus 176 during a power management cycle initiated by the graphics controller 200. The "#" following "VSync" denotes that the vertical sync signal 174 is asserted when it is driven to a logically low voltage level. At point A, the graphics controller 200 asserts the vertical sync signal 174 and places encoded state information on the two least significant bits of the display device data bus 176. Although in this example the vertical sync signal 174 is used, it is possible to use other control signals such as the blank signal 173 and the horizontal sync signal 175. Further, although this example uses the two least significant bits of the display device data bus 176 to transfer the encoded state information, any or all of the display device data bus 176 bits may be used.

The vertical sync signal 174 remains asserted by the graphics controller 200 for preferably at least two clock periods. The duration of the assertion of the vertical sync signal 174 may greatly exceed two clock periods. At point B, the graphics controller 200 deasserts the vertical sync signal 174 and at point C the graphics controller ceases to drive, or in other words tristates, the vertical sync signal 174. At point D, the display device 190 begins to drive the vertical sync signal 174 and at point E asserts the vertical sync signal 174. Also at point E the display device may place status, register, or other information on the display device data bus 176. The display device 190 continues to assert the vertical sync signal 174 until the display device 190 has transferred all of the necessary information to the graphics controller 200. Then, at point F, the display device 190 deasserts the vertical sync signal 174 and one clock period later ceases driving the vertical sync signal 174 at point G. Finally, at point H, the graphics controller regains control of the vertical synch signal.

The above discussion in connection with FIG. 3 is meant to provide an illustration of one embodiment. However, it is possible for the number of clock periods between events to vary widely from those shown in FIG. 3.

Figure 4:
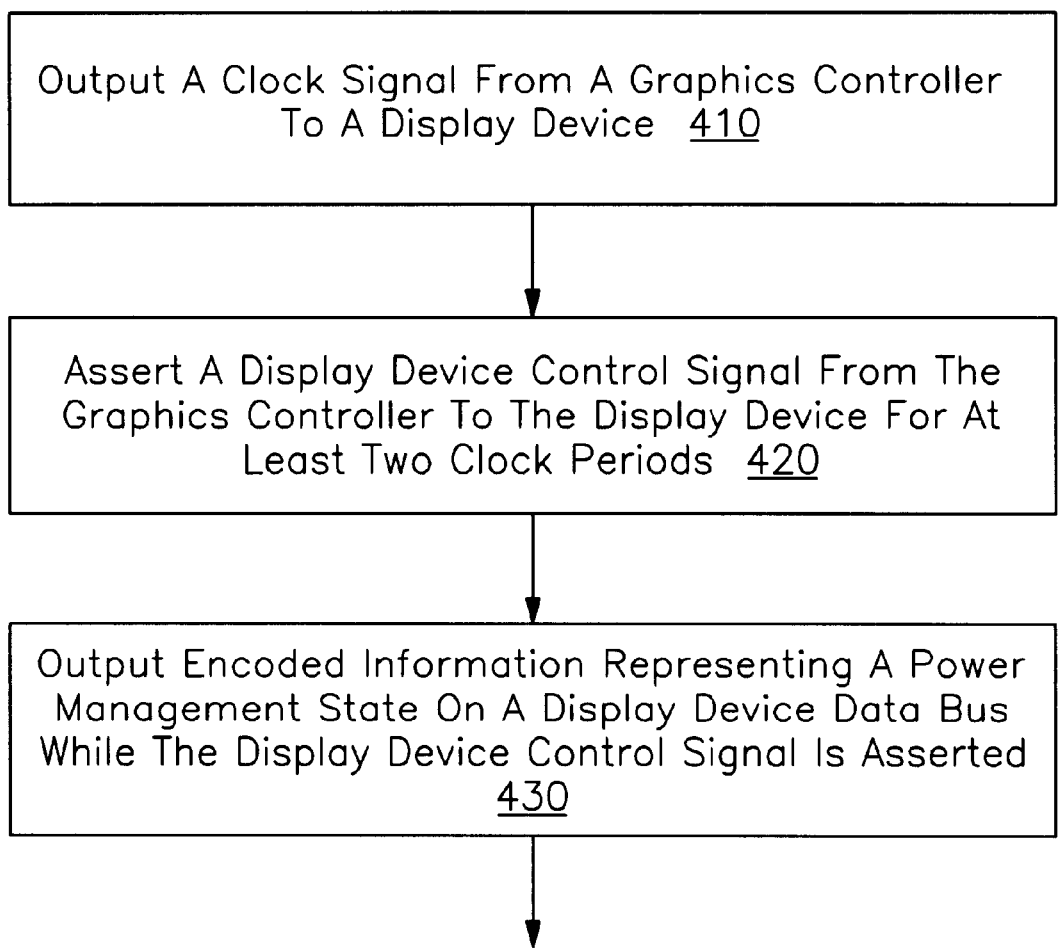
FIG. 4 is a flow diagram of one embodiment of a method for power managing a display device.

FIG. 4 is a flow diagram of one embodiment of a method for power managing a display device. At step 410, a clock signal is output from a graphics controller. A display device control signal is asserted by a graphics controller for a duration of at least two clock periods at step 420. Step 430 indicates that while the display device control signal is asserted, encoded information representing a power management state is output from the graphics controller to a display device on a display device data bus. These steps describe generally that which has been previously discussed in connection with FIGS. 1 through 3.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus for communicating power management information between a computer system and an external display device, comprising:

a clock output circuit to output a clock signal;
a display device control signal input/output circuit to output a display device control signal upon a request from an operating system of the computer system to place the display device in a power management state, the power management state including an advanced configuration and power interface (ACPI) state, the display device control signal selected from a plurality of display device control signals; and
a display device data bus input/output circuit to output an encoded information on a display device data bus when the display device control signal output circuit asserts the display device control signal, the encoded information to represent a power management state, the display device data bus including an eight bit data path, the ACPI state encoded on a least significant two bits of the eight bit data path.

2. The apparatus of claim 1, wherein the display device control signal is a vertical sync signal.

3. The apparatus of claim 1, wherein the display device control signal is a horizontal sync signal.

4. The apparatus of claim 1, wherein the display device control signal is a blank signal.

5. The apparatus of claim 1, the display device control signal input/output circuit to assert the display device control signal for a duration of at least 2 clock periods before deasserting the display device control signal.

6. The apparatus of claim 5, the display device control signal input/output circuit to tristate the display device control signal after deasserting the display device control signal.

7. The apparatus of claim 6, the display device control signal input/output circuit to sense an assertion of the display device control signal by a display device.

8. The apparatus of claim 7, the display device data bus input/output circuit to receive information from the display device when the display device control signal input/output circuit senses the assertion of the display device control signal by the display device.

9. A method for communicating power management information between a computer system and an external display device, comprising:

outputting a clock signal from a graphics controller;

asserting a display device control signal from the graphics controller for a duration of at least two clock periods upon a request from an operating system of the computer system to place the display device in a power management state, the power management state including an advanced configuration and power interface (ACPI) state, the display device control signal selected from a plurality of display device control signals; and outputting an encoded information from the graphics controller to a display device on a display device data bus while asserting the display device control signal, the encoded information to represent a power management state, the display device data bus including an eight bit data path, the ACPI state encoded on a least significant two bits of the eight bit data path.

10. The method of claim 9 wherein the display device control signal is a vertical sync signal.

11. The method of claim 9 wherein the display device control signal is a horizontal sync signal.

12. The method of claim 9 wherein the display device control signal is a blank signal.

13. The method of claim 9 further comprising transferring information from the display device to the graphics controller in response to the display device receiving the encoded information.

14. A system for communicating power management information between a computer system and an external display device, comprising:

a display device electrically coupled to a display device data bus and further coupled to a display device control signal line and a clock signal line;

a graphics controller including a clock output circuit to output a clock signal on the clock signal line;

a display device control signal input/output circuit to output a display device control signal on the display device control signal line upon a request from an operating system of the computer system to place the display device in a power management state, the power management state including an advanced configuration and power interface (ACPI) state, the display device control signal selected from a plurality of display device control signals; and a display device data bus input/output circuit to output an encoded information on the display device data bus when the display device control signal output circuit asserts the display device control signal, the encoded information to represent a power management state, the display device data bus including an eight bit data path, the ACPI state encoded on a least significant two bits of the eight bit data path.

15. The system of claim 14, wherein the display device control signal is a vertical sync signal.

16. The system of claim 14, wherein the display device control signal is a horizontal sync signal.

17. The system of claim 14, wherein the display device control signal is a blank signal.

18. The system of claim 14, the display device control signal input/output circuit to assert the display device control signal for a duration of at least 2 clock periods before deasserting the display device control signal.

19. The system of claim 18, the display device control signal input/output circuit to tristate the display device control signal after deasserting the display device control signal.

20. The system of claim 19, the display device control signal input/output circuit to sense an assertion of the display device control signal by the display device.

21. The system of claim 20, the display device data bus input/output circuit to receive information from the display device when the digital display device control signal input/output circuit senses the assertion of the display device control signal by the display device.

* * * * *

UNITED STATES PATENT AND TRADEMARK OFFICE
CERTIFICATE OF CORRECTION

PATENT NO. : 6,603,480 B1 Page 1 of 1
DATED : August 5, 2003
INVENTOR(S) : Shah

It is certified that error appears in the above-identified patent and that said Letters Patent is hereby corrected as shown below:

<u>Column 2,</u>
Line 53, delete "(AGPJ" and insert -- (AGP) --.

<u>Column 3,</u>
Line 9, delete ",".

Signed and Sealed this

Twentieth Day of January, 2004

JON W. DUDAS
*Acting Director of the United States Patent and Trademark Office*